United States Patent
Kim et al.

(10) Patent No.: US 8,165,593 B2
(45) Date of Patent: *Apr. 24, 2012

(54) METHOD AND APPARATUS FOR ALLOCATING RADIO RESOURCES IN A WIRELESS COMMUNICATION SYSTEM

(75) Inventors: Nam-Gi Kim, Suwon-si (KR); Jung-Je Son, Seongnam-si (KR); Min-Hee Cho, Suwon-si (KR); Jae-Hyuk Jang, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 1231 days.

This patent is subject to a terminal disclaimer.

(21) Appl. No.: 11/870,181

(22) Filed: Oct. 10, 2007

(65) Prior Publication Data

US 2008/0090584 A1    Apr. 17, 2008

(30) Foreign Application Priority Data

Oct. 11, 2006 (KR) .................. 10-2006-0098829

(51) Int. Cl.
*H04W 72/00* (2009.01)
(52) U.S. Cl. .................. 455/450; 455/452.1
(58) Field of Classification Search .............. 455/452.1, 455/561, 450–451, 452.2, 453–455, 509–510; 370/328–330, 338, 436, 437
See application file for complete search history.

(56) References Cited

U.S. PATENT DOCUMENTS

| | | | | |
|---|---|---|---|---|
| 5,987,021 A * | 11/1999 | Erickson et al. | ............... | 370/347 |
| 6,075,990 A * | 6/2000 | Shin | ............................... | 455/440 |
| 7,069,009 B2 | 6/2006 | Li et al. | | |
| 7,089,017 B2 * | 8/2006 | Chen et al. | ..................... | 455/453 |
| 7,366,134 B2 * | 4/2008 | Bose et al. | ..................... | 370/329 |
| 7,382,753 B2 * | 6/2008 | Dick et al. | ..................... | 370/335 |
| 7,684,372 B2 * | 3/2010 | Beale et al. | ..................... | 370/334 |
| 7,894,394 B2 * | 2/2011 | Kim et al. | ..................... | 370/329 |
| 2005/0120160 A1 | 6/2005 | Plouffe et al. | | |
| 2005/0286408 A1 * | 12/2005 | Jin et al. | ......................... | 370/208 |
| 2006/0217123 A1 * | 9/2006 | Ishii et al. | ..................... | 455/450 |
| 2008/0062944 A1 * | 3/2008 | Smith et al. | ..................... | 370/342 |
| 2008/0101287 A1 * | 5/2008 | Kim et al. | ..................... | 370/329 |

FOREIGN PATENT DOCUMENTS

| | | |
|---|---|---|
| KR | 1020040028445 | 4/2004 |
| KR | 1020050081136 | 8/2005 |
| WO | WO 2004/089009 | 10/2004 |

* cited by examiner

*Primary Examiner* — Brandon Miller
(74) *Attorney, Agent, or Firm* — The Farrell Law Firm, P.C.

(57) ABSTRACT

A method and apparatus for allocating radio resources in a wireless communication system are provided, in which a Base Station (BS) transmits information indicating current allocated resources to a Mobile Station (MS) in every predetermined periods, defines a virtual resource space with current unallocated resources, when the MS requests resource allocation, generates resource allocation information about resources allocated in the virtual resource space, and transmits the resource allocation information to the MS.

20 Claims, 10 Drawing Sheets

METHOD AND APPARATUS FOR ALLOCATING RADIO RESOURCES IN A WIRELESS COMMUNICATION SYSTEM

PRIORITY

This application claims priority under 35 U.S.C. §119 to an application filed in the Korean Intellectual Property Office on Oct. 11, 2006 and assigned Ser. No. 2006-98829, the contents of which are incorporated herein by reference.

BACKGROUND OF THE INVENTION

1. Field of the Invention

The present invention relates generally to a method and apparatus for allocating resources in a wireless communication system, and in particular, to a method and apparatus for adaptively allocating fragmented resources using a virtual resource space to avoid the degradation of system performance caused by the fragmented resources.

2. Description of the Related Art

Providing services with diverse Quality of Service (QoS) requirements at or above 100 Mbps to users is an active study area for a future-generation communication system called a $4^{th}$ Generation (4G) communication system. Particularly, research is being conducted on the provisioning of high-speed service by ensuring mobility and QoS to Broadband Wireless Access (BWA) communication systems such as Wireless Local Area Network (WLAN) and Wireless Metropolitan Area Network (WMAN). A major example of these systems is an Institute of Electrical and Electronics Engineers (IEEE) 802.16e system.

As illustrated in FIG. 1, the IEEE 802.16e communication system notifies each Mobile Station (MS) of radio resources allocated to it by MAPs in every frame. For downlink resource allocation, a two-dimensional position and size resource allocation scheme is used which specifies the frequency-axis start point and length of allocated resources or the time-axis start point and length of the allocated resources, and for uplink resource allocation, a one-dimensional length resource allocation scheme is applied which indicates only the length of allocated resources.

If many users want to be allocated a small amount of radio resources periodically for a predetermined time period, like Voice over Internet Protocol (VoIP) users, transmission of resource allocation information to the users in every frame may increase the size of MAPs too much. Since more resources are taken to transmit the MAP information than actual traffic information, system inefficiency results.

To avert the problem of an increased MAP size, a periodic allocation scheme has been proposed in which radio resources are allocated periodically rather than on a frame basis. The periodic allocation scheme gives authorization to users to use radio resources of other frames as well as radio resources of a current frame. For instance, as illustrated in FIG. 2, radio resources A 220 in a $k^{th}$ frame 201, radio resources A 222 in a $(k+1)^{th}$ frame 203, and radio resources A 224 in a $(k+2)^{th}$ frame 205 are allocated to user 1 by a MAP in the $k^{th}$ frame 201. Therefore, user 1 can use all of radio resources A 220, 222 and 224 without further resource allocation by MAPs in the $(k+1)^{th}$ frame 203 and the $(k+2)^{th}$ frame 205.

The above-described periodic allocation scheme obviates the need for resource allocation frame by frame, thus reducing the overhead of MAPs. However, since the start position and size of the allocated radio resources are indicated for resource allocation, resources are fragmented and the fragmented resources are not available for allocation. Referring to FIG. 3, when radio resources 310 are allocated to user 5 in a $(k+3)^{th}$ frame 301, not enough radio resources 312 to be allocated to a user may remain between the radio resources 310 and radio resources 314 allocated to user 3.

The fragmented small-size radio resources are not available for allocation to a user in the conventional resource allocation scheme. Accordingly, there exists a need for developing a method for overcoming the radio resource fragmentation, while reducing the overhead of MAPs.

SUMMARY OF THE INVENTION

An aspect of the present invention is to substantially solve at least the above problems and/or disadvantages and to provide at least the advantages below. Accordingly, an aspect of the present invention is to provide a method and apparatus for allocating resources in a wireless communication system.

Another aspect of the present invention is to provide a method and apparatus for defining a virtual resource space by fragmented resources and allocating the fragmented resources of the virtual resource space in a successive manner in a wireless communication system.

A further aspect of the present invention is to provide a method and apparatus for allocating resources so as to reduce MAP overhead in a wireless communication system.

Still another aspect of the present invention is to provide a method and apparatus for allocating resources using a bitmap and a Point Allocation (PA) in a wireless communication system.

According to one aspect of the present invention, there is provided a method for allocating radio resources in a Base Station (BS) in a wireless communication system, in which the BS transmits information indicating current allocated resources to an MS in every predetermined period, defines a virtual resource space with current unallocated resources, when the MS requests resource allocation, generates resource allocation information about resources allocated in the virtual resource space, and transmits the resource allocation information to the MS.

According to another aspect of the present invention, there is provided a method for being allocated radio resources in an MS in a wireless communication system, in which the MS receives information indicating already allocated resources from a BS in every predetermined period, receives resource allocation information about resources allocated in a virtual resource space, defines the virtual resource space with unallocated resources, and detects the allocated resources in the virtual resource space.

According to a further aspect of the present invention, there is provided an apparatus for allocating radio resources in a BS in a wireless communication system, in which a scheduler determines resources to be allocated and deallocated for each MS and generates resource allocation information associated with the determined resources using a bitmap indicating current allocated resources and a virtual resource space defined by unallocated resources, and a resource allocator allocates and deallocates the resources for the each MS according to the resource allocation information.

According to still another aspect of the present invention, there is provided an apparatus for being allocated radio resources in an MS in a wireless communication system, in which an allocated resources decider decides resources allocated or deallocated to the MS based on a bitmap or resource allocation information associated with a virtual resource space received from a BS, and a subchannel demapper uses the allocated resources or discontinues using the deallocated resources under control of the allocated resources decider.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENTS

Preferred embodiments of the present invention will be described herein below with reference to the accompanying drawings. In the following description, well-known functions or constructions are not described in detail since they would obscure the invention in unnecessary detail.

The present invention provides a method and apparatus for allocating and deallocating radio resources using a bitmap indicating allocated radio resources and a virtual resource space defined by unallocated radio resources in a wireless communication system.

The bitmap has as many bits as the size of radio resources, each bit indicating whether radio resources corresponding to the bit are allocated to a user. A Point Allocation (PA) specifies the start position and length of allocated or deallocated radio resources in the virtual resource space. Thus, radio resources to be allocated and deallocated can be indicated by the PA. Herein, a position-based allocation scheme is used which specifies the start position and size of allocated resources to allocate radio resources of the virtual resource space to users. As position-based allocation schemes, there are a start-length scheme that indicates the start position and length of allocated resources and a tree allocation scheme that indicates the start position and length of allocated resources by a binary tree.

Figure 1:
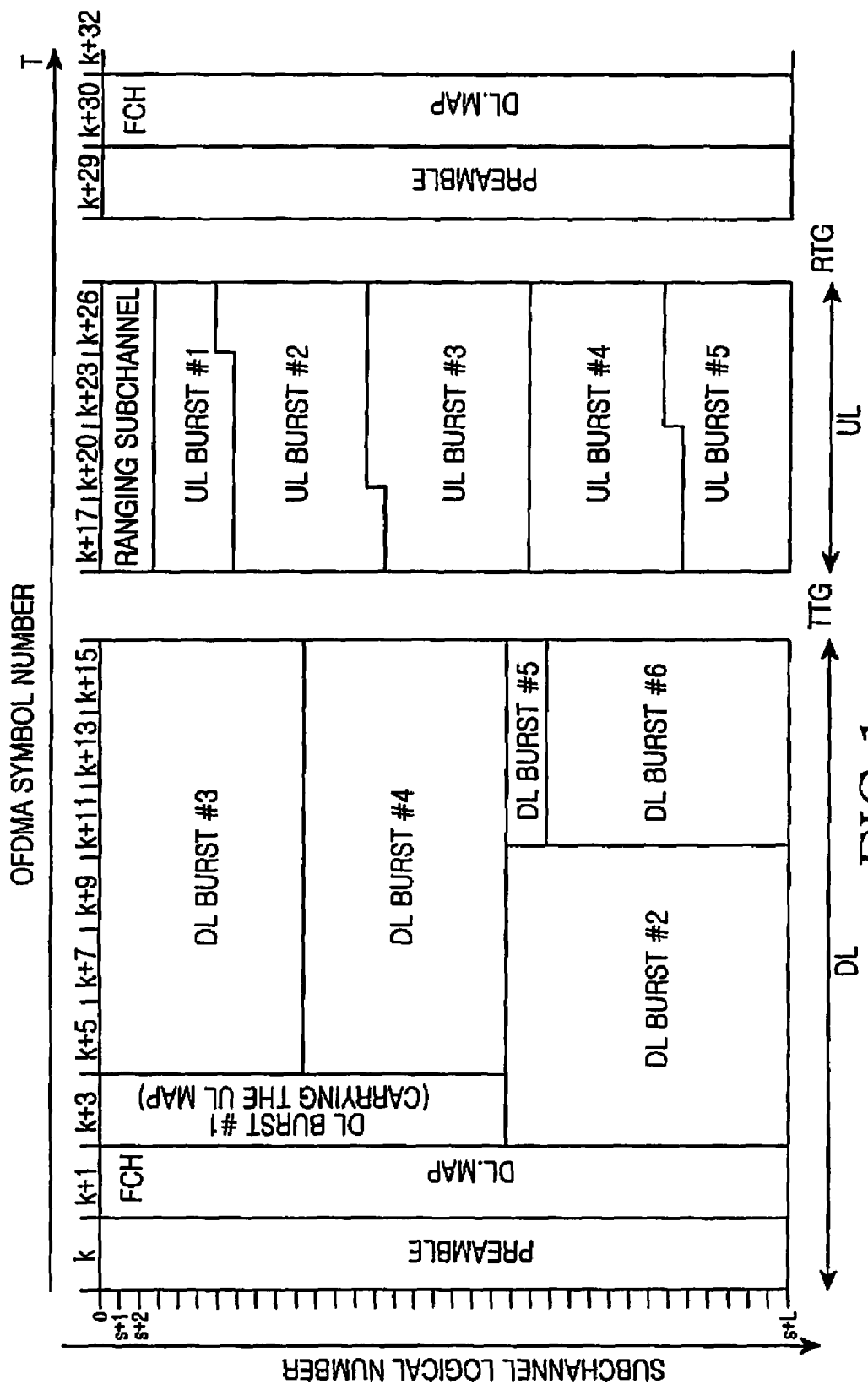
FIG. 1 illustrates a frame structure for allocating radio resources in a conventional wireless communication system.
Figure 2:
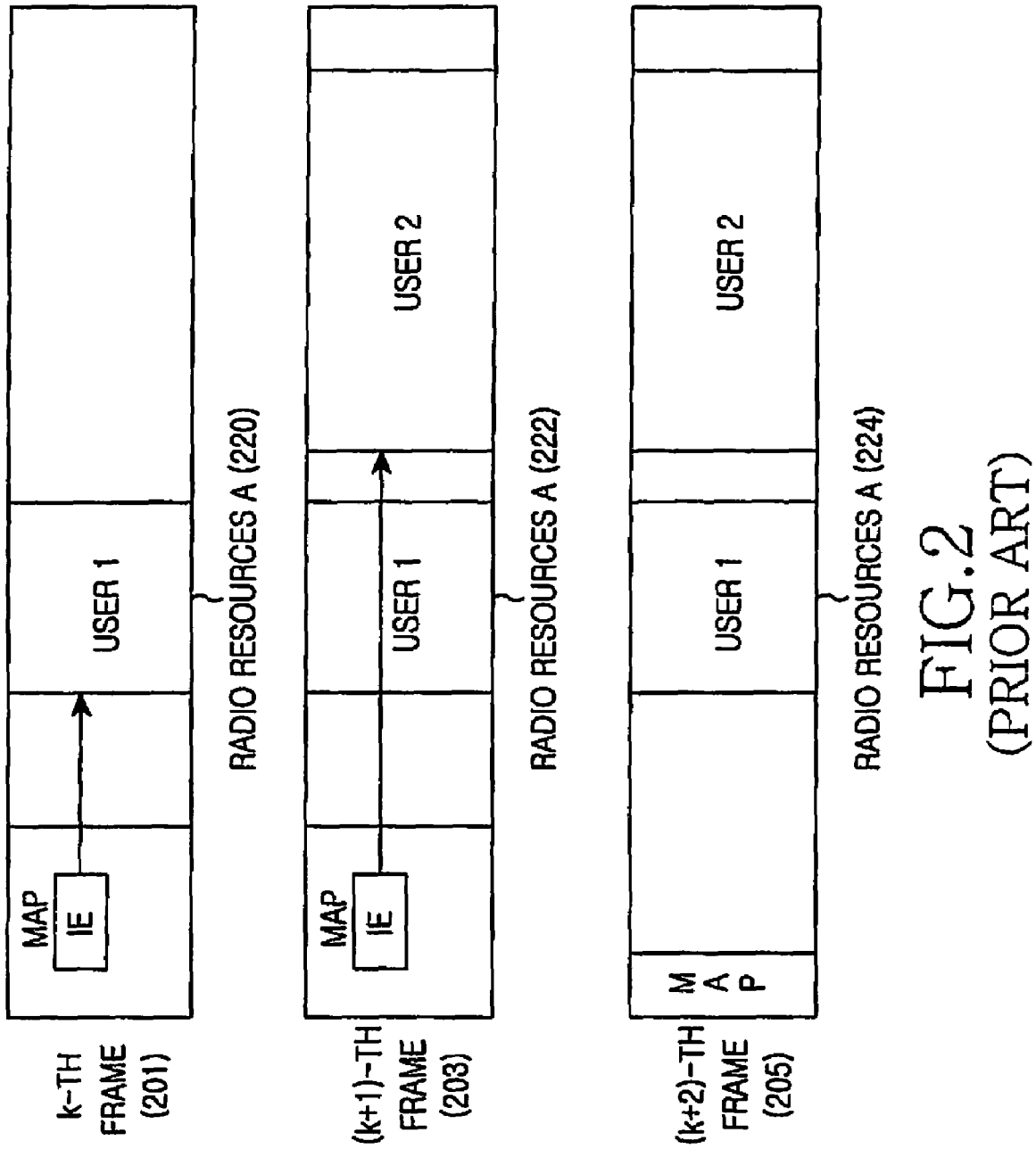
FIG. 2 illustrates a periodic allocation scheme in the conventional wireless communication system.
Figure 3:
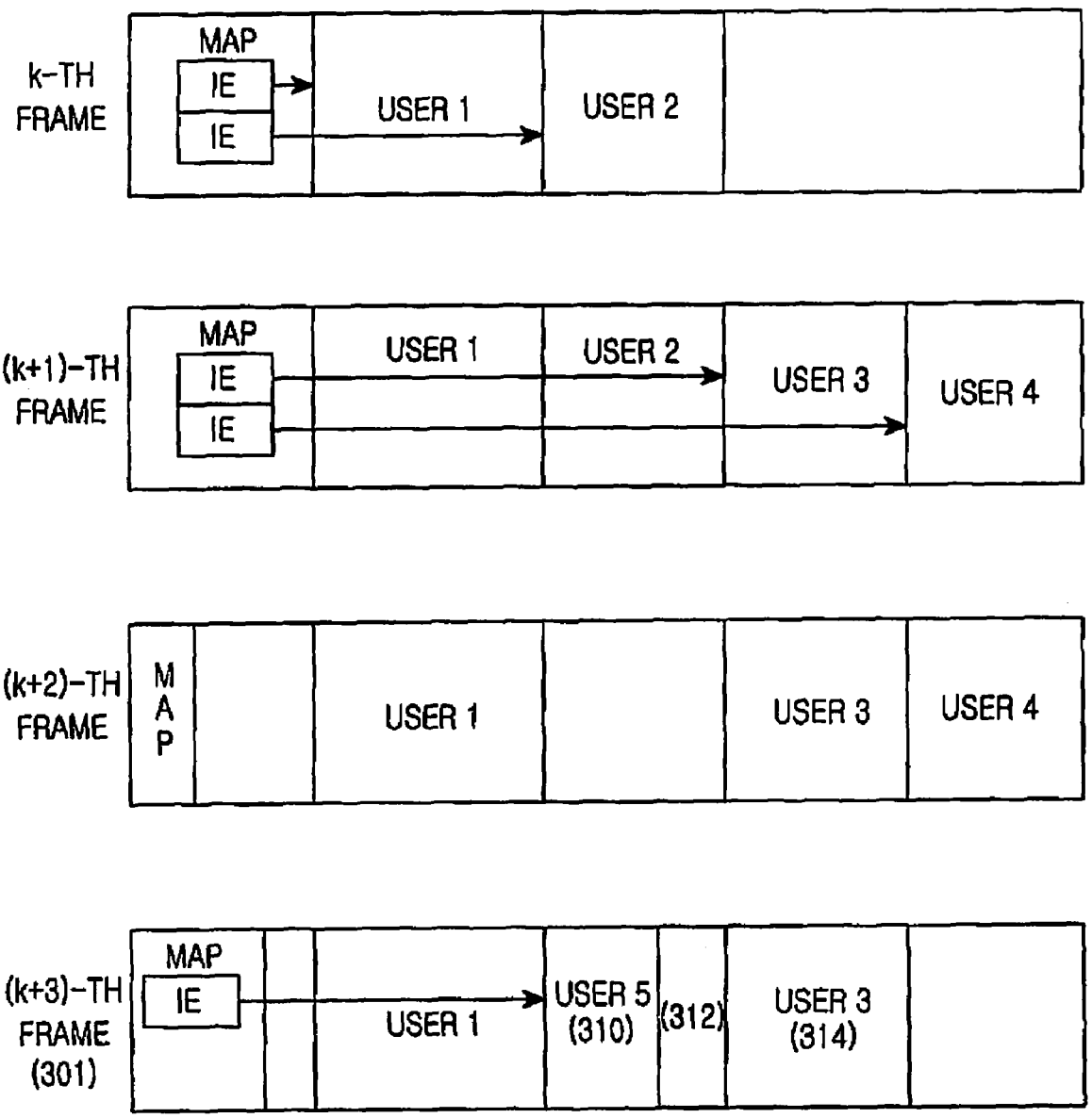
FIG. 3 illustrates resource fragmentation caused by the periodic allocation scheme in the conventional wireless communication system.
Figure 4:
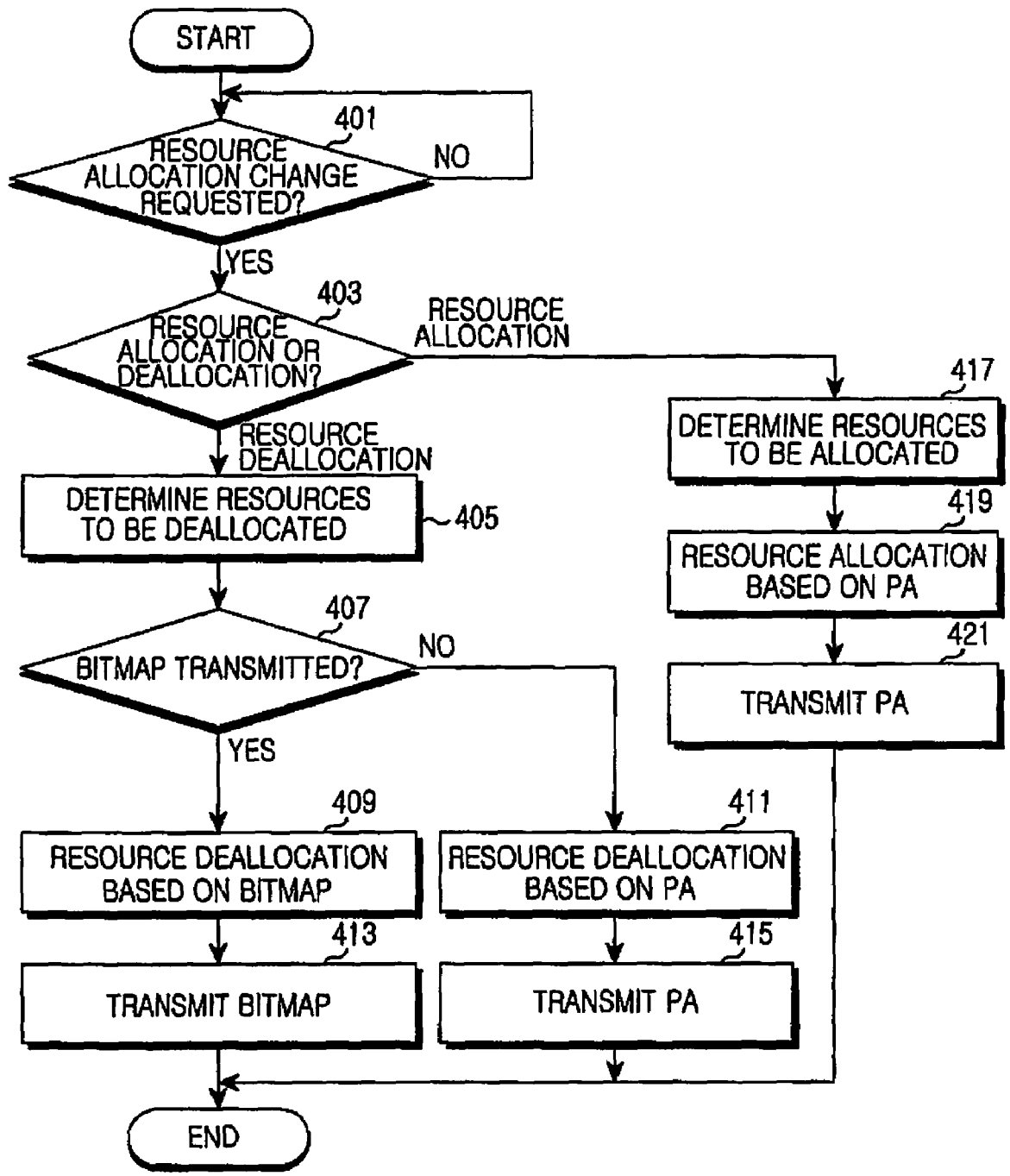
FIG. 4 is a flowchart of an operation for adaptively allocating and deallocating radio resources in a Base Station (BS) in a wireless communication system according to an embodiment of the present invention.

FIG. 4 is a flowchart of an operation for adaptively allocating and deallocating radio resources in a Base Station (BS) in a wireless communication system according to an embodiment of the present invention.

Referring to FIG. 4, the BS determines whether a resource allocation change is requested for a particular user in step 401. If the resource allocation change is requested, the BS determines whether the resource allocation change is resource allocation or resource deallocation in step 403.

Figure 6:
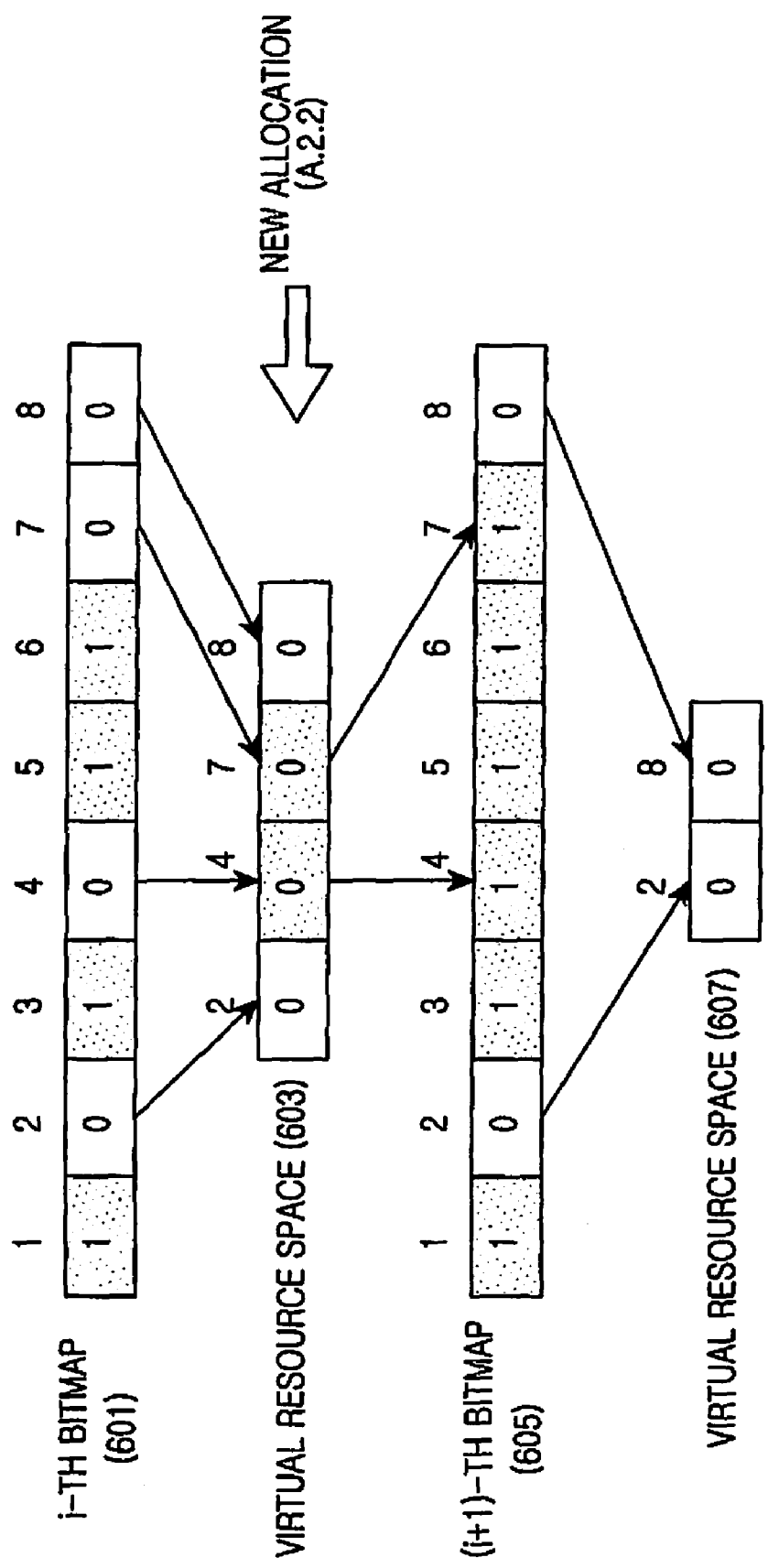
FIG. 6 illustrates a virtual resource space-based resource allocation and deallocation method in the wireless communication system according to an embodiment of the present invention.

In the case of resource allocation, the BS checks the size of resources required for the user in step 417. In step 419, the BS forms a virtual resource space with unallocated radio resources and allocates the required resources to the user by indicating the start position and size of resources allocated to the user in the virtual resource space. Referring to FIG. 6, $1^{st}$, $3^{rd}$, $5^{th}$ and $6^{th}$ radio resources among eight radio resources have already been allocated and thus an $i^{th}$ bitmap 601 has a value of "10101100". The remaining unallocated $2^{nd}$, $4^{th}$, $7^{th}$, and $8^{th}$ radio resources form a virtual resource space 603. If user A requests allocation of two radio resources, the BS allocates two radio resources to User A by indicating the start position and length of the radio resources in the virtual resource space 603 (New Allocation (A, 2, 2)). In New Allocation (A, 2, 2), the first parameter A identifies the user to which radio resources of the virtual resource space 603 are allocated, the second parameter 2 indicates the start position of the allocated resources, and the third parameter 2 indicates the length of the allocated radio resources.

In step 421, the BS includes information about the virtual resource space-based resource allocation (i.e. a PA) in a MAP of a current frame and transmits the resource allocation information to the user. Then, the BS ends the process.

In the case of resource deallocation, the BS determines resources to be deallocated among the already allocated resources of the user in step 405 and determines whether a bitmap has been transmitted to the user after the resources to be deallocated were allocated to the user in step 407.

Figure 7:
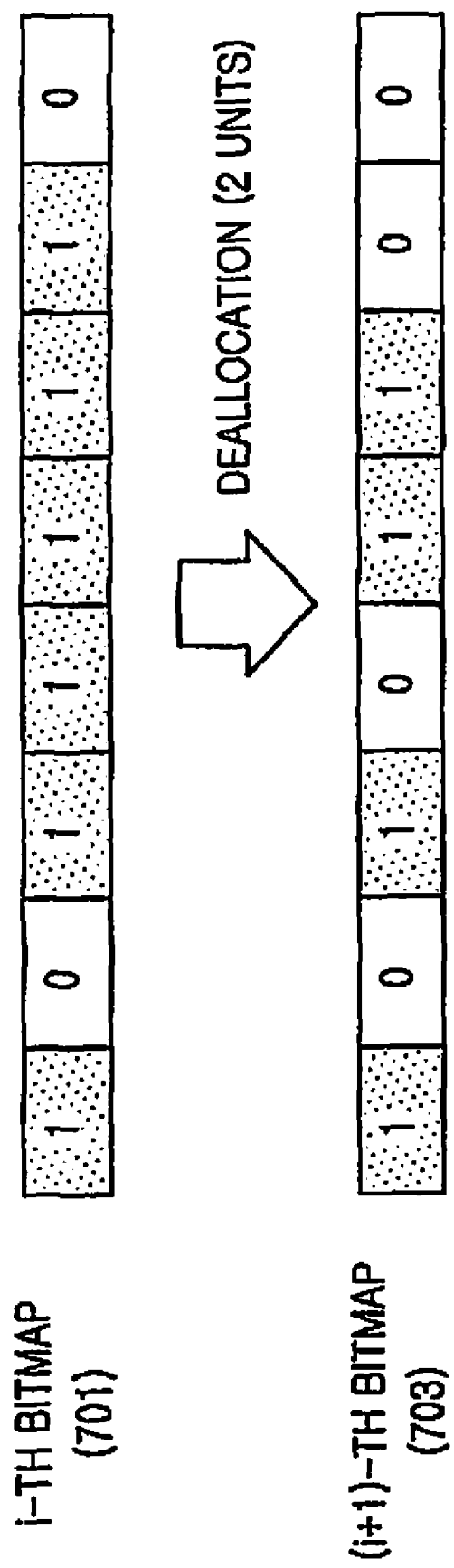
FIG. 7 illustrates a bitmap-based resource deallocation method in the wireless communication system according to an embodiment of the present invention.

If the bitmap has been transmitted, the BS deallocates the resources using the bitmap in step 409. Referring to FIG. 6, if an $(i+1)^{th}$ bitmap 605 is transmitted after resources are allocated in the virtual resource space 603 formed based on the $i^{th}$ bitmap 601, a new virtual resource space 607 is defined based on the $(i+1)^{th}$ bitmap 605 and thus has different resources from those of the virtual resource space 603. Therefore, already allocated resources cannot be released using the new virtual resource space 607. Hence, when the bitmap was transmitted after resources to be deallocated were allocated, the BS can deallocate the resources using the bitmap. Referring to FIG. 7, when $4^{th}$ and $7^{th}$ resources are to be deallocated in an $i^{th}$ bitmap 701 having a value of "10111110", an $(i+1)^{th}$ bitmap 703 of "10101100" is formed by converting bits representing the $4^{th}$ and $7^{th}$ resources to 0s. Thus, the $4^{th}$ and $7^{th}$ resources are deallocated.

In step 413, the BS transmits resource allocation information based on the bitmap to the user by the MAP in the current frame, thus notifying of the deallocated resources. Then the BS ends the process.

If the bitmap has not been transmitted in step 407, the BS deallocates the resources for the user using the virtual resource space in step 411. Referring to FIG. 6, if the bitmap is not transmitted after resources are allocated using the virtual resource space 603 formed based on the $i^{th}$ bitmap 601, the virtual resource space 603 is kept unchanged. Thus, the BS can deallocate the resources by indicating the start position and length of the resources in the virtual resource space 603.

In step 415, the BS transmits resource allocation information based on the bitmap to the user, i.e. a PA by the MAP in the current frame, thus notifying of the deallocated resources. Then the BS ends the process.

The bitmap is transmitted every predetermined period to indicate allocated radio resources and unallocated radio resources, and the PA is transmitted adaptively according to a change in the allocated radio resources of the user. For example, referring to FIG. 8, the bitmap is transmitted every four frames to represent current allocated and deallocated resources. The PA is transmitted to indicate allocated or deallocated resources, upon request for resource allocation or deallocation. Also, the bitmap can be transmitted irrespective of its transmission period when bitmap-based resource deallocation is required. That is, when resource deallocation based on the PA is not available as illustrated in FIG. 4, the bitmap is used for the resource deallocation.

Figure 5:
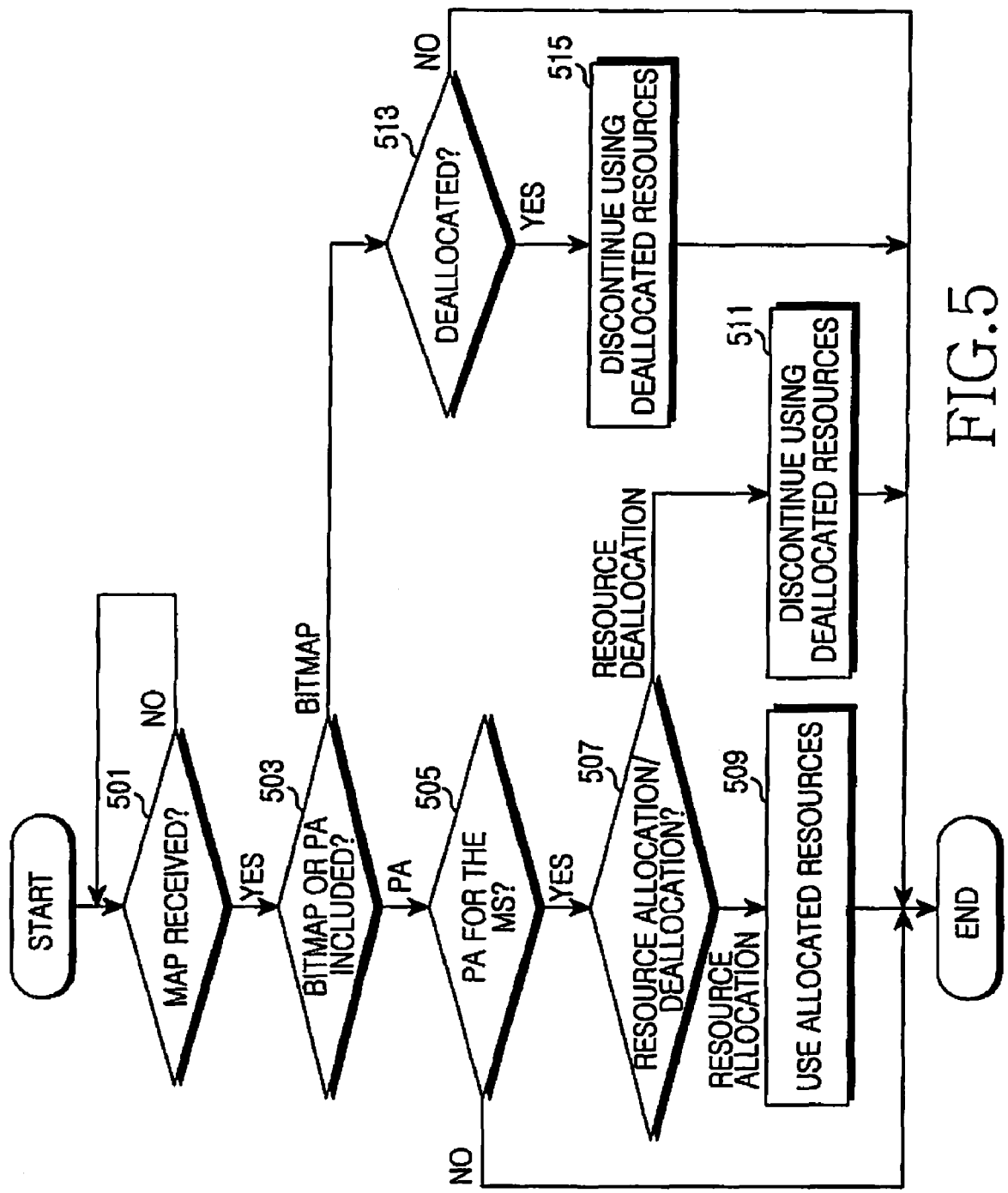
FIG. 5 is a flowchart of an operation for detecting allocated radio resources or deallocated radio resources in a Mobile Station (MS) in the wireless communication system according to an embodiment of the present invention.

FIG. 5 is a flowchart of an operation for detecting allocated radio resources or deallocated radio resources in an MS in the wireless communication system according to an embodiment of the present invention.

Referring to FIG. 5, the MS monitors reception of a MAP including resource allocation information from the BS in step 501. Upon receipt of the MAP, the MS determines whether the MAP has a bitmap or virtual resource space-based resource allocation information (i.e. a PA) in step 503.

If the MAP includes a bitmap in step 503, the MS determines from the bitmap whether resources allocated to the MS have been deallocated in step 513. If the resources have been deallocated, the MS discontinues using the deallocated resources in step 515 and then ends the process. If none of the allocated resources have been deallocated, the MS ends the algorithm of the present invention.

If the MAP includes the PA in step 503, the MS determines whether the PA is associated with the MS in step 505. If the PA is not associated with the MS, the MS ends the process. On the contrary, if the PA is associated with the MS, the MS determines whether resources have been allocated or deallocated for the MS in step 507.

Figure 8:
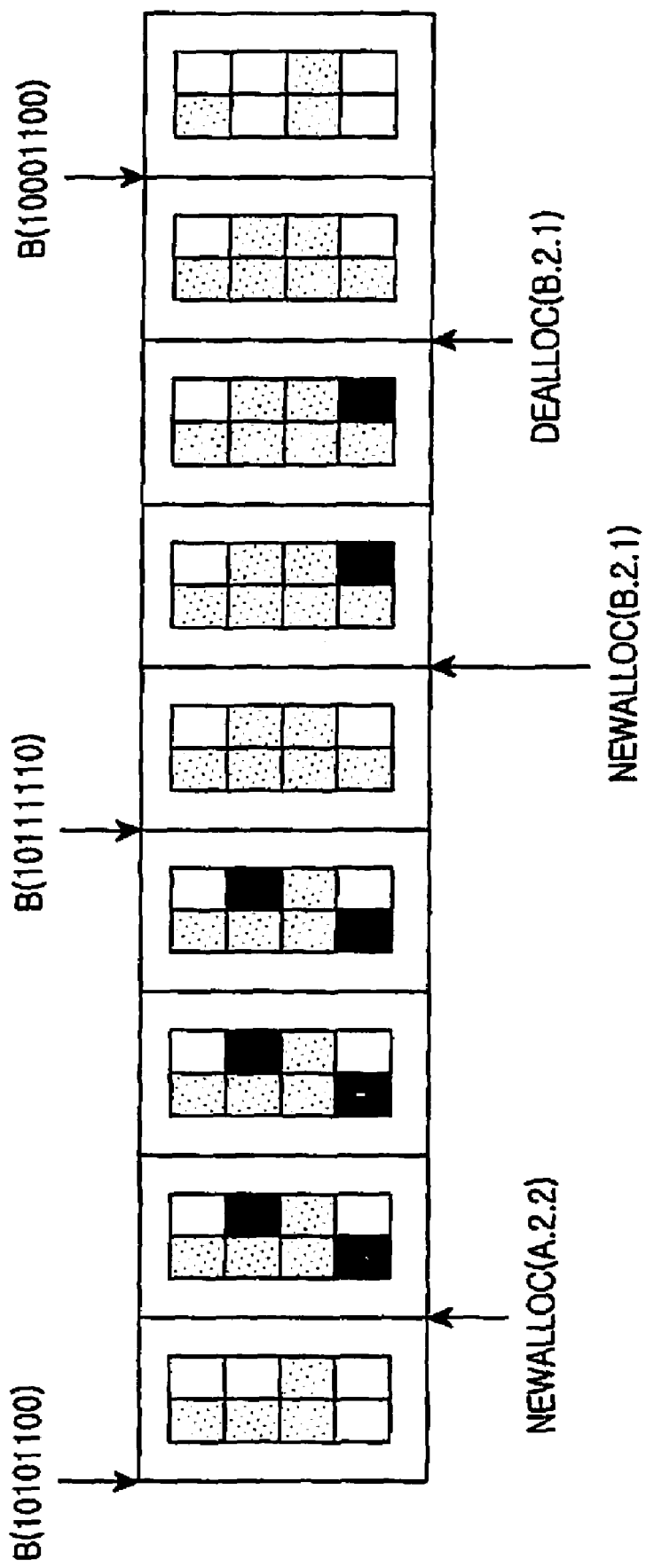
FIG. 8 illustrates resource allocation and deallocation using a bitmap and a virtual resource space in the wireless communication system according to an embodiment of the present invention.

In the case of resource allocation, the MS forms a virtual resource space using a bitmap received before receiving the PA and determines the allocated resources in the virtual resource space in step 509. For example, as illustrated in FIG. 8, when user A receives a PA, NewAlloc(A,2,2) after receiving a bitmap of 10101100, the MS forms a virtual resource space based on the bitmap and determines from the PA that the 4$^{th}$ and 7$^{th}$ radio resources of the virtual resource space are allocated to the MS. Then, the MS ends the process.

In the case of resource deallocation, the MS determines deallocated radio resources using a previously formed virtual resource space and discontinues using the deallocated radio resources in step 511. Referring to FIG. 8, if user B receives DeAlloc(B, 2, 1), the MS of user B finds out two resources in a virtual resource space formed based on a bitmap of 10111110 and determines that the 8$^{th}$ radio resource allocated to the MS is now deallocated. Then, the MS ends the process.

As described above, in the presence of a PA for the MS in the received MAP, the MS can determine allocated or deallocated resources from the PA, only if the latest received bitmap is correct.

Figure 9:
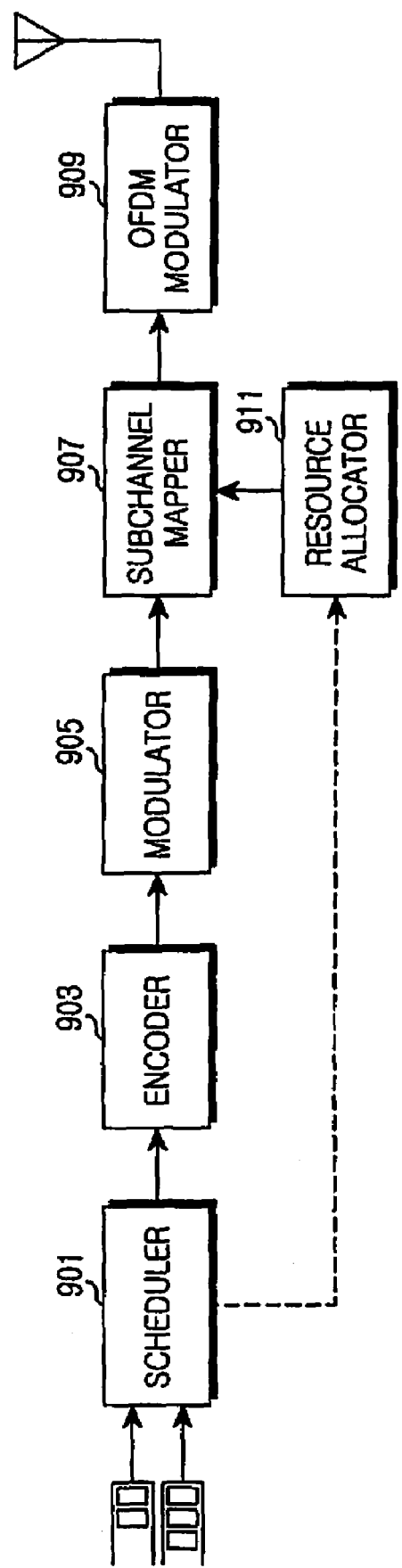
FIG. 9 is a block diagram of the BS for allocating radio resources in the wireless communication system according to an embodiment of the present invention.

FIG. 9 is a block diagram of the BS for allocating radio resources in the wireless communication system according to an embodiment of the present invention. The BS includes a scheduler 901, an encoder 903, a modulator 905, a subchannel mapper 907, an OFDM modulator 909, and a resource allocator 911.

Referring to FIG. 9, the scheduler 901 schedules data received for MSs, for resource allocation, and provides the data to the encoder 903 and scheduling information, i.e. resource allocation information to the resource allocator 911. In particular, the scheduler 901 allocates or deallocates resources to each of the MSs using a bitmap and a virtual resource space in the present invention. For example, in the case of resource allocation, unallocated resources in a virtual resource space can be allocated to a user by use of a PA indicating the start position and length of the allocated resources. In the case of resource deallocation, resources can be deallocated using a bitmap indicating allocated radio resources and unallocated resources, or a PA. To do so, it is determined whether the bitmap was transmitted after resources to be deallocated were allocated. If the bitmap was transmitted, the resources are deallocated using the bitmap. If the bitmap was not transmitted, the resources are deallocated using the PA.

The encoder 903 encodes the data of each UE received from the scheduler 901 at a predetermined coding rate. The encoder 903 can be a convolutional encoder, a turbo encoder, a Low Density Parity Check (LDPC) encoder, or the like.

The modulator 905 maps the coded data of each user to signal points on a constellation corresponding to a predetermined modulation scheme, thus creating modulation symbols.

The subchannel mapper 907 maps the modulated data of each user to subchannels according to subchannel mapping information received from the resource allocator 911.

The OFDM modulator 909 converts the mapped data to a time signal by Inverse Fast Fourier Transform (IFFT), converts the time signal to an analog signal, upconverts the analog signal to a Radio Frequency (RF) signal transmittable in the air, and transmits the RF signal through a transmit antenna on a radio channel.

The resource allocator 911 determines subchannels to which the modulated data of each user output from the modulator 905 are to be mapped according to the scheduling information, that is, the resource allocation information for the user received from the scheduler 901. Then, the resource allocator 911 provides information about the subchannels, i.e. the subchannel mapping information to the subchannel mapper 907.

Figure 10:
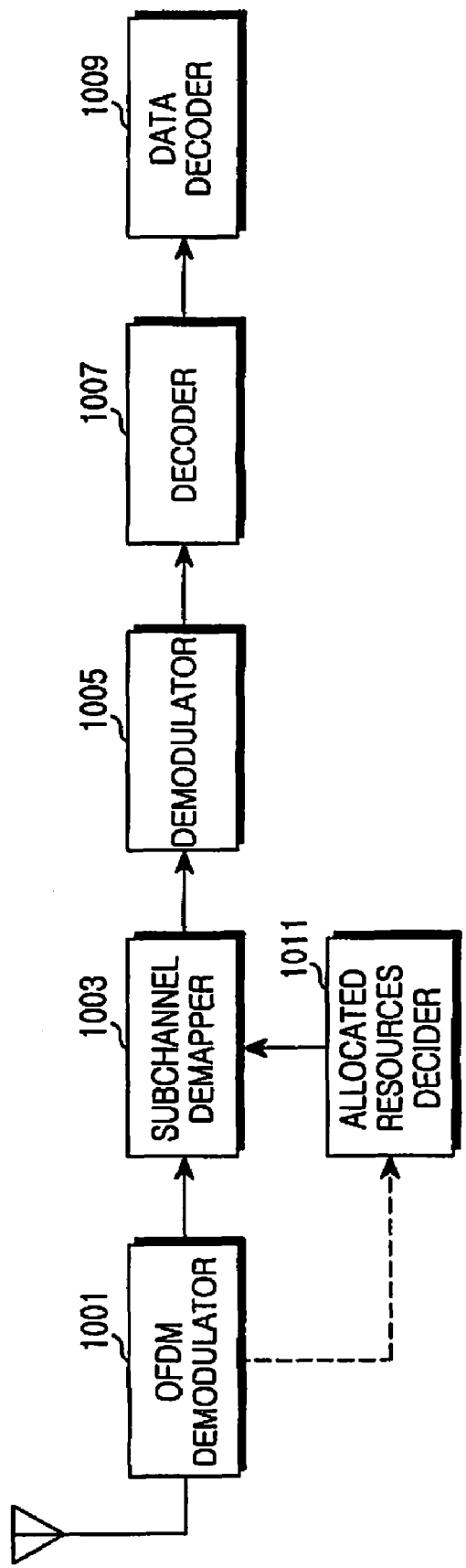
FIG. 10 is a block diagram of the MS for being allocated radio resources in the wireless communication system according to the present invention.

FIG. 10 is a block diagram of the MS for being allocated radio resources in the wireless communication system according to the present invention. The MS includes an OFDM demodulator 1001, a subchannel demapper 1003, a demodulator 1005, a decoder 1007, a data decoder 1009, and an allocated resources decider 1011.

Referring to FIG. 10, the OFDM demodulator 1001 downconverts an RF signal received through a receive antenna to a baseband signal, converts the analog baseband signal to a digital signal, and converts the digital time signal to frequency data by Fast Fourier Transform (FFT).

The subchannel demapper 1003 selects subchannels destined for the MS from among a plurality of subchannels received from the OFDM demodulator 1001. The subchannel demapper 1003 can select subchannels allocated to the MS based on allocated subchannel information received from the allocated resources decider 1011.

The demodulator 1005 demodulates the selected subchannels in accordance with a predetermined modulation scheme. The decoder 1007 decodes the demodulated data received from the demodulator 1005, thereby recovering original data transmitted by the BS. The data decoder 1009 converts the recovered data to an analog signal.

The allocated resources decider 1011 receives MAP information transmitted by the BS from the OFDM demodulator 1001 and determines resources newly allocated to the MS or already allocated resources to be deallocated based on resource allocation information included in the MAP. The resource allocation information is a bitmap or a PA indicating the start position and length of resources in a virtual resource space. The allocated resource decider 1011 locates deallocated resources among resources in use for the MS from the bitmap, and locates newly allocated resources and deallocated resources by the PA.

As is apparent from the above description, the present invention adaptively allocates resources by forming a virtual resource space with unallocated resources in a wireless communication system. Therefore, fragmented resources can be allocated to one user at one time, thereby increasing system performance. In addition, a bitmap indicating allocated resources and unallocated resources is transmitted periodically and a PA indicating allocated resources or deallocated resources is transmitted only when resource allocation or deallocation is requested, thus obviating the need for transmitting resource allocation information in every frame. As a result, MAP overhead is reduced.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A method for allocating radio resources in a Base Station (BS) in a wireless communication system, comprising:
   transmitting information indicating currently allocated resources to a Mobile Station (MS) at predetermined periods;
   defining a virtual resource space including currently unallocated resources;
   receiving a resource allocation request from the MS;
   allocating resources for the MS from among the currently unallocated resources included in the virtual space;
   generating resource allocation information identifying the resources as included in the virtual resource space; and
   transmitting the resource allocation information to the MS.

2. The method of claim 1, wherein the resource allocation information indicates a start position and length of the resources as included in the virtual resource space, and
   wherein the virtual resource space includes only the currently unallocated resources.

3. The method of claim 1, further comprising:
   determining, when the MS requests deallocation of allocated resources, whether information indicating the currently allocated resources has been transmitted after the resources were allocated;
   generating resource deallocation information about resources deallocated in the virtual resource space, if the information has not been transmitted; and
   transmitting the resource deallocation information.

4. The method of claim 3, wherein the resource deallocation information indicates a start position and length of the deallocated resources in the virtual resource space.

5. The method of claim 3, further comprising generating a bitmap indicating the deallocated resources and transmitting the bitmap to the MS, if the information has been transmitted.

6. The method of claim 1, wherein the information indicating the currently allocated resources is a bitmap indicating the currently allocated resources and the currently unallocated resources.

7. A method for being allocated radio resources in a Mobile Station (MS) in a wireless communication system, comprising:
   receiving information indicating already allocated resources from a Base Station (BS) at predetermined periods;
   defining a virtual resource space including currently unallocated resources;
   receiving resource allocation information identifying resources being allocated to the MS from among the currently unallocated resources, the resource allocation information identifying the resources as included in the virtual resource space; and
   detecting the resources in the virtual resource space, based on the resource allocation information.

8. The method of claim 7, wherein the resource allocation information indicates a start position and length of the resources as included in the virtual resource space, and
   wherein the virtual resource space includes only the currently unallocated resources.

9. The method of claim 7, further comprising receiving a bitmap indicating deallocated resources among the already allocated resources from the BS.

10. The method of claim 7, further comprising receiving resource deallocation information indicating deallocated resources in the virtual resource space from the BS.

11. The method of claim 10, wherein the resource deallocation information indicates a start position and length of the deallocated resources in the virtual resource space.

12. An apparatus for allocating radio resources to Mobile Stations (MSs) in a Base Station (BS) in a wireless communication system, comprising:
   a scheduler for determining resources to be allocated and deallocated for each of the MSs and generating resource allocation information associated with the determined resources using a bitmap indicating currently allocated resources and a virtual resource space defined by unallocated resources; and
   a resource allocator for allocating and deallocating the resources for each of the MSs according to the resource allocation information,
   wherein if resources are allocated to an MS, the scheduler generates the resource allocation information to identify the resources allocated to the MS, from among the unallocated resources as included in the virtual resource space.

13. The apparatus of claim 12, wherein the bitmap is transmitted at predetermined periods.

14. The apparatus of claim 12, wherein if the resources are allocated to the MS, the scheduler generates the resource allocation information indicating a start position and length of the resources allocated to the MS, from among the unallocated resources as included in the virtual resource space, and
   wherein the virtual resource space includes only the unallocated resources.

15. The apparatus of claim 12, wherein if resources are deallocated to an MS, the scheduler determines whether the bitmap has been transmitted after the resources were allocated, and generates resource allocation information indicating a start position and length of the deallocated resources in the virtual resource space, if the bitmap has not been transmitted.

16. The apparatus of claim 15, wherein if the bitmap has been transmitted, the scheduler generates a bitmap indicating the deallocated resources.

17. An apparatus for being allocated radio resources in a Mobile Station (MS) in a wireless communication system, comprising:
- an allocated resources decider for deciding resources allocated or deallocated to the MS based on a bitmap or resource allocation information associated with a virtual resource space received from a Base Station (BS); and
- a subchannel demapper for using the allocated resources or discontinuing using the deallocated resources under control of the allocated resources decider,
- wherein the virtual resource space is defined by unallocated resources indicated by the bitmap, and the resource allocation information indicates the resources allocated to the MS, from among the unallocated resources as included in the virtual resource space.

18. The apparatus of claim 17, wherein the bitmap is received at predetermined periods.

19. The apparatus of claim 17, wherein the resource allocation information indicates a start position and length of the allocated or the deallocated resources as included in the virtual resource space, and wherein the virtual resource space includes only currently unallocated resources.

20. A Base Station (BS) for allocating radio resources in a wireless communication system, comprising:
- means for transmitting information indicating current allocated resources to a Mobile Station (MS) at predetermined periods;
- means for defining a virtual resource space including currently unallocated resources;
- means for receiving a resource allocation request from the MS;
- means for allocating resources for the MS from among the currently unallocated resources included in the virtual space;
- means for generating resource allocation information identifying the resources as included in the virtual resource space; and
- means for transmitting the resource allocation information to the MS.

* * * * *